United States Patent [19]

Achtman et al.

[11] 4,448,520
[45] May 15, 1984

[54] PHOTOGRAPHIC PRINTING DEVICE

[76] Inventors: Myron B. Achtman; Malcolm S. Achtman, both of 116 Barmondsey Way NW., Calgary, Alberta, Canada, T3K 1V4

[21] Appl. No.: 360,208

[22] Filed: Mar. 22, 1982

[51] Int. Cl.³ ............................................. G03B 27/58
[52] U.S. Cl. ........................................ 355/74; 355/75; 355/123; 355/125; 355/127
[58] Field of Search ..................... 355/72, 74, 75, 122, 355/123, 124, 125, 126, 127, 128, 129, 130, 131

[56] References Cited

U.S. PATENT DOCUMENTS

| | | | |
|---|---|---|---|
| 70,564 | 11/1867 | Heddon | 355/125 |
| 2,807,199 | 9/1957 | Alberti | 355/127 |
| 4,274,734 | 6/1981 | Moss | 355/74 |

FOREIGN PATENT DOCUMENTS

| | | | |
|---|---|---|---|
| 661942 | 4/1937 | Fed. Rep. of Germany | 355/74 |
| 498009 | 12/1938 | United Kingdom | 355/74 |

*Primary Examiner*—Monroe H. Hayes
*Attorney, Agent, or Firm*—Harold H. Dutton, Jr.; George H. Dunsmuir

[57] ABSTRACT

A device for making both photographic proof sheets and enlargements includes a flat base plate with a low rectangular fence defining an area for accommodating a sheet of photographic paper, template carriers hingedly connected to the base plate and a variety of glassless templates which are slidable into and out of the carriers for making photographic proof sheets without the use of a pressure plate, masking a variety of areas of photographic paper while providing a light-tight seal when closed upon the base plate and holding photographic paper flat for the printing of enlargements.

10 Claims, 11 Drawing Figures

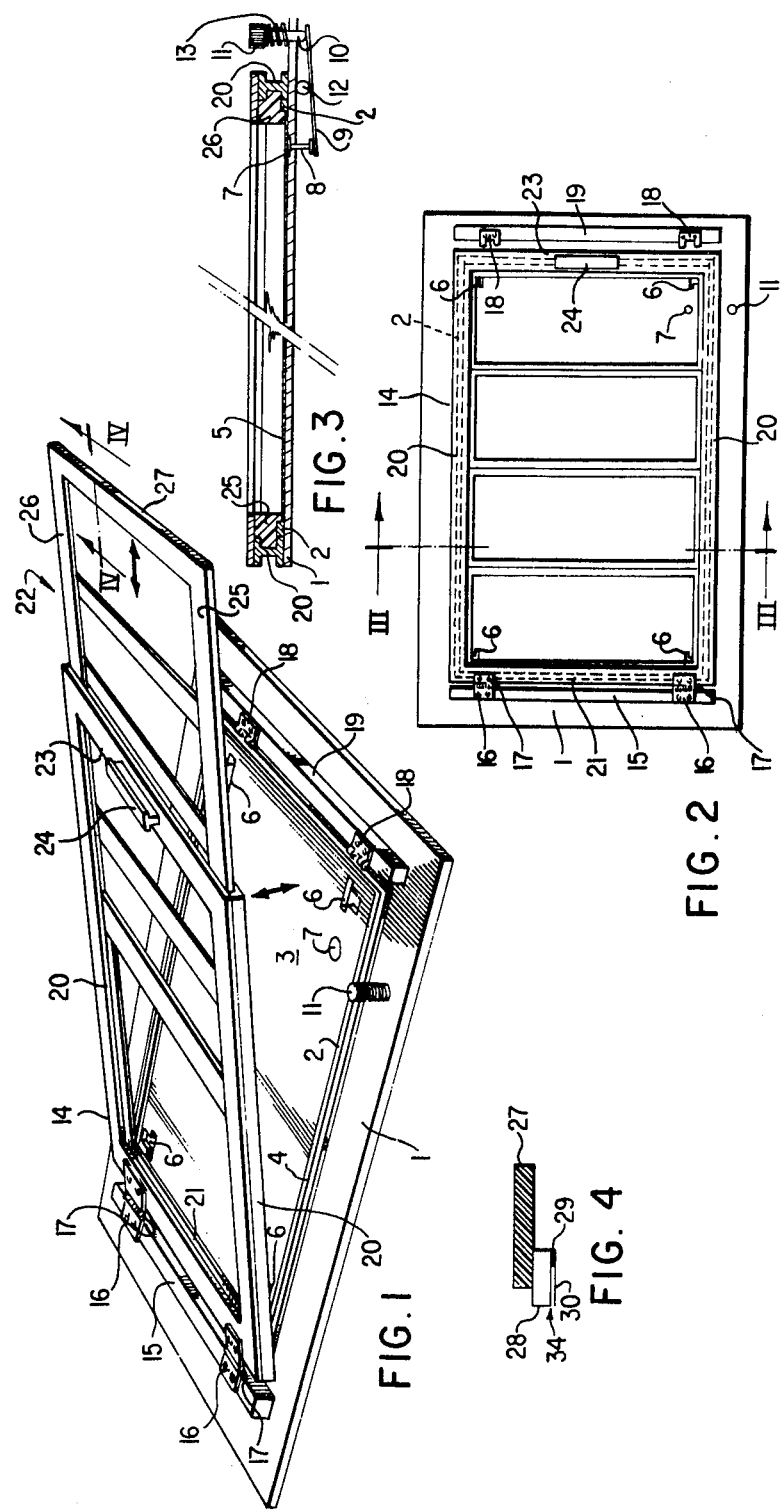

PHOTOGRAPHIC PRINTING DEVICE

BACKGROUND OF THE INVENTION

This invention relates to a photographic printing device for use in the preparation of photographic proof sheets and enlargements.

Printing devices with some features similar to those disclosed by this application are described for example in U.S. Pat. Nos. 2,273,285 issued to O. Steiner on Feb. 17, 1942; 2,500,782 issued to C. H. Wiklund on Mar. 14, 1950; 2,807,199 issued to G. G. Alberti on Sept. 24, 1957; 2,895,396 issued to J. S. Pollock et al on July 21, 1959 and 2,949,077 issued to M. Friedel on Aug. 16, 1960. Each of the devices disclosed by such patents is intended for one function only, e.g. either the contact printing of multiple film strips on a single sheet of photographic paper, or the printing of enlargements of various sizes.

The object of the present invention is to provide a relatively simple, inexpensive, multiple use photographic device.

Some advantages of the device of the present invention are as follows:

(i) the bringing together in one glassless device the capability of producing both proof sheets and photographic enlargements, (ii) the provision of a device capable of doing photographic proof sheets without the use of a pressure plate such as the glass or plastic sheet found in all existing conventional contact printers, and (iii) the provision of a photographic base plate and carrier device which is capable of being rendered light-tight to simplify a variety of enlargement and special effects operations.

BRIEF SUMMARY OF THE INVENTION

Accordingly, the present invention relates to a photographic printing device comprising a planar base plate means; fence means defining a raised border around a photographic print paper receiving area on said base plate means; carrier means for mounting on said base plate means for holding a variety of photographic printing templates above said photographic paper; and connector means for releasably connecting said carrier means to said base plate means.

The device of the present invention is intended for use with a variety of templates. The use of a variety of templates formed of sturdy lightweight plastic and Plexiglas (a trademark for a synthetic plastic) results in a versatile, compact device. Certain templates, called film-holding templates can be used to produce proof sheets from a variety of sizes of black and white or colour film, or from mounted or unmounted transparencies. There are numerous advantages in using film-holding templates for making proof sheets, compared to conventional contact printing. The film-holding templates hold the film accurately and curled film is automatically flattened out when inserted. Being "glassless" no surface of the template contacts the image area of the film, eliminating the risk of dust or soiling, fingerprints, scratches or marks, or loss of clarity or colour shift often occurring in conventional contact printing devices. Two or more film-holding templates can be loaded in advance so that a series of proof sheets can be exposed and printed rapidly. The film-holding templates should cost less than conventional printing devices.

Certain templates can be used to make enlargements of a variety of sizes. Others can be used for masking, i.e. to produce a print with an image having the shape of the mask, the remainder of the print being white border. A vignetting mask, acetate mask or other masking templates can be used depending on the desired result. In each case the basic base plate and carrier defined hereinbefore are used. Together they provide a light-tight seal around a sheet of photographic paper to simplify a variety of enlargement and special effects operations.

BRIEF DESCRIPTION OF THE DRAWINGS

The invention will now be described in greater detail with reference to the accompanying drawings wherein;

FIG. 1 is a schematic, perspective view of the base plate and template carrier of the present invention with the carrier in the partly open position;

FIG. 2 is a plan view of the base plate and carrier of FIG. 1 in the closed position;

FIG. 3 is a cross-section taken generally along line III—III of FIG. 2;

FIG. 4 is a cross-section taken generally along line IV—IV of FIG. 1;

DESCRIPTION OF THE PREFERRED EMBODIMENT(S)

Figure 5:
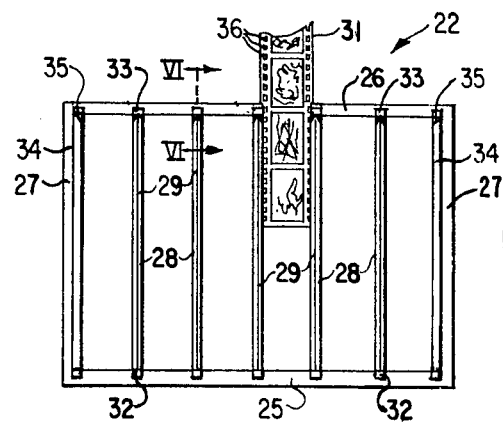
FIG. 5 is a bottom plan view of a film-holding template for use in the device of FIGS. 1 to 4.

With reference to FIG. 1 of the drawings, the invention includes a planar base plate 1 formed of any suitable material such as hard plastic. Thin strips 2 of plastic are mounted on the base plate 1 for defining a fence of border around a central rectangular area 3. A strip 4 of fluorescent tape is provided in the strip 2. The tape glows in the dark to help define the position of the fence under safelight conditions or in total darkness. The central area 3 of the base plate is intended to receive a sheet of photographic paper 5 (FIG. 3) for making proof sheets or enlargements from negatives, slides, etc. An opening 6 is provided in each corner of the central area 3 for receiving an insert (not shown) the top end of which is sticky for holding a sheet of photographic paper flat on the base plate, particularly when producing a borderless print. The inserts may be removed for other operations.

A paper eject lug 7 is also provided in such central area 3 for raising a sheet of photographic paper slightly from the base plate 1, facilitating removal of the sheet. As shown in FIG. 3 the lug 7 is mounted on the top end of a rod 8, which is slidably mounted in the base plate 1. One end of a lever 9 engages the bottom of the rod 8 beneath the base plate 1 and the other end of the lever is connected to the bottom end of a pin 10 extending through the base plate outside of the border 2. When a button 11 on the pin 10 is pressed, the centre of the lever 9 rotates around a rod 12 on the bottom of the base plate 1. A helical spring 13 on the pin 10 biases the lug 7 to the rest position, in which the top of the lug is flush with the base plate 1. When the button 11 is pressed the lug 7 moves upwardly to raise one corner of the photographic paper 5.

A rectangular template carrier 14 is pivotally connected to a bar 15 on one end of the base plate 1 by means of hinges 16 and removable hinge pins 17. Similar hinges 18 are provided on another bar 19 on the other end of the base plate 1 for connecting a second carrier to the base plate 1 as described hereinafter in greater detail. The template carrier 14 includes a pair of sides 20 and an end piece 21 defined by plastic strips having an I-shaped or C-shaped cross-sectional configuration. Thus, the sides define tracks for slidably receiving a variety of photographic printing templates, e.g. the film-holding template generally indicated at 22. The sides 20 are connected at the other end by a plastic strip 23. A handle 24 is attached to the strip 23 for raising and lowering the carrier 14. The strip 23 is connected to the top edges of the sides 20 permitting the passage of the template 22 and the strip 21 acts as a stop to limit the movement of the template 22 into the carrier 14. The strip 21 is also grooved for receiving one end of the template 22.

The template 22 is a film-holding template which is used for making proof sheets and is illustrated herein as an example for each of the templates. When the carrier 14 is closed a light-tight seal is provided around the sides of the photographic paper 5 (FIG. 3).

Referring now to FIG. 5, the film-holding template 22 of the present invention includes the sides 25 and 26, and ends 27 defining a rectangle which can be slid into the carrier 14. Crossbars 28 extend between the sides 25 and 26 of the template.

Figure 6:
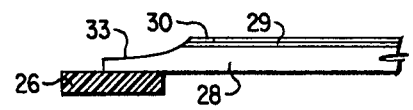
FIG. 6 is a cross-sectional view taken generally along line VI—VI of FIG. 5.

Thin, opaque guide strips 29 are provided on the centres of the crossbars. Very thin, transparent plastic covers 30 (FIG. 6) on the crossbars 28 define tracks for receiving film strips 31. The covers 30 are sealed to the crossbars 28 along the longitudinal centre of the guide strips 29. One end 32 of each cover 30 is closed at side 25 and the other side 26 is open and bevelled at 33 for facilitating loading of the film strips. A narrow track defining strip 34 (FIG. 4) is provided on each end 27 of the template and is open at the corner 35 (FIG. 5).

By inserting a plurality of film strips 31 into the template 22 a proof sheet of prints can be made on a large sheet of paper 5 in the area 3. Sprocketed film 31 can be inserted into the tracks using a pencil (not shown) or other pointed object, which is placed into one of the perforations 36 near the leading end of the film and the film is drawn into the template 22. Film strips 31 can be inserted into a pair of templates 22 and in turn be placed into a pair of carriers 14. By pivotally connecting a pair of carriers 14 to the bars 15 and 19 and closing and opening them alternately, proof sheets can be produced rapidly.

In making enlargements the base plate 1 and the template carrier 14 of FIGS. 1 to 4 are placed on a work area, e.g. the base board of an enlarger. A negative or slide is placed into an enlarger carrier (not shown) and the image is focused on the area 3 of the base plate 1. For such purpose the base plate 1 is normally white or yellow. Under safelight conditions a sheet 5 of photographic paper is placed on the area 3 within the fence 2. It is easy to position the sheet 5 using a dim safelight, or even in total darkness, because the fence 2 contains the fluorescent illuminated strip 4. With the paper 5 in position the carrier 14 is closed and an exposure is made.

Figure 7:
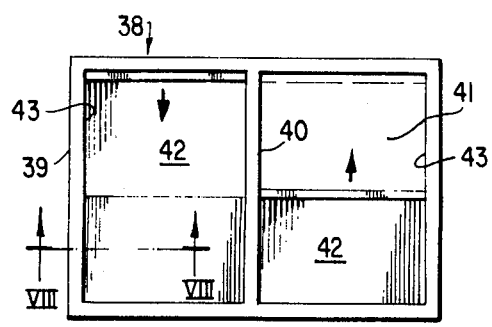
FIG. 7 is a plan view of a multiple printing enlargement template for use in the device of FIGS. 1 to 4.
Figure 8:
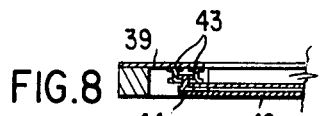
FIG. 8 is a cross-section taken generally along line VIII—VIII of FIG. 7.

A multiple printing enlargement template 38 is illustrated in FIGS. 7 and 8. The template 38 includes a rectangular frame 39 with a crossbar 40 dividing the frame into a pair of rectangular openings 41. A rectangular door 42 is slidably mounted in a pair of tracks defined by small plastic strips 43 attached to the ends of the frame 39 and the crossbar 40 and a similar I-shaped strip 44 attached to each side of the door 42. The multiple printing enlargement template 38 is inserted into the carrier 14 in the same manner as the template 22. When the doors 42 are closed, a light-tight seal is provided for the photographic paper 5 and room lights may be turned on. A white area (not shown) on each door defines the exact image area of each opening 41. Thus, the projected image from the enlarger can be focused and composed in the white area when the door is closed with the photographic paper 5 on the area 3. By opening and closing the doors 42 and rotating a sheet of photographic paper 180°, four individual areas of photographic paper can be exposed. Similar templates can be produced with a greater or smaller number of doors of various sizes and shapes.

Figures 9, 10, 11:
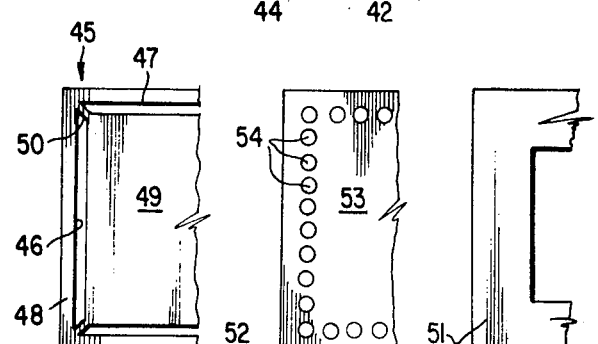
FIGS. 9 to 11 are plan views of portions of a variety of masks used in the device of FIGS. 1 to 4.

A mask-holding template (not shown) includes a rectangular frame similar to the frame of template 22 (FIG. 5) with tracks for receiving a variety of masks (FIGS. 9 to 11). By providing two tracks, one above the other, on each side of the frame, an opaque shield can be mounted in the frame for a variety of uses as described hereinafter. The mask-holding template is inserted into the carrier 14 in the same manner as the template 22.

In order to produce a border around a picture the masks of FIGS. 9 to 11 may be used. The mask of FIG. 9 generally indicated at 45 includes a rectangular sheet of opaque plastic with longitudinal and transverse slots 46 and 47 respectively adjacent the sides and ends of the sheet. The result is a sheet with a thin border 48 connected to a rectangular central area 49 by thin corner strips 50. The mask 51 of FIG. 10 is merely a rectangular border. The mask of FIG. 11 generally indicated at 52 is an opaque rectangular sheet 53 with a border of circular holes 54 close to the periphery thereof.

In use, the mask 45 or 52 is placed into the mask-holding template with the opaque shield and together they are placed into one carrier 14. The mask 51 is placed into another mask-holding template and inserted into a separate carrier 14. The carriers 14 are connected to opposite ends of the base plate 1. The rectangular mask 51 is closed on the base plate 1. A negative or slide is placed into the enlarger carrier and an image is composed on the area 3 of the base plate 1 within the open area of the mask 51. The enlarger light is switched off and the carrier 14 holding the mask 51 is opened. Under safelight conditions, a sheet of photographic paper 5 is placed in the area 3 of the base plate 1. The carrier 14 is closed to replace the mask 51 on the sheet 5 and the enlarger lamp is switched on to expose the unmasked area. The carrier 14 holding the mask 51 is opened and the other carrier 14 holding the mask 45 or 52, along with the opaque shield is closed. Room lights may be switched on to remove the negative or slide from the enlarger and to re-set the filtration required to create a coloured border on the sheet 5. Under safelight conditions the opaque shield is removed from the mask-holding template and the enlarger lamp is switched on once again to expose the border area provided by mask 45 or 52.

The use of templates and other photographic printing elements of the type described hereinbefore leads to definite advantages. For example, a film-holding template of the type illustrated in FIGS. 5 and 6 holds the film strips flat, there is no contact between the film and the photographic print paper and the problems involving dirt or dust are reduced or eliminated. Because there is no pressure on the film there is less likelihood of damage to the film. Moreover, unlike in contact printing, there is no loss of clarity or colour balance shifting.

It will be appreciated that the uses described hereinbefore are merely examples of practical applications of the device of the present invention. Other uses and modifications will be readily apparent to the man skilled in the art.

What we claim is:

1. A photographic printing device for use in producing photographic proof sheets and photographic enlargements without the use of a pressure plate comprising a planar base plate means; a continuous raised fence means on said base plate means defining a recessed area for receiving a sheet of photographic print paper; frame means; means for releasably hingedly connecting said frame means to said base plate along one edge of said frame means; carrier means for holding photographic film and including a first peripheral frame member and a plurality of film receiving slots; masking means including a second peripheral frame member and a masking element; said frame means comprising an inwardly opening track portion on three sides thereof and being open on the fourth side thereof for receiving selectively said carrier means or said masking means.

2. A device as in claim 1 and including means for ejecting photographic paper from said recess.

3. A device as in claim 1 and including a fluorescent strip on said fence.

4. A device according to claim 1, wherein said connecting means includes hinge means for pivotally interconnecting said frame means and said base plate means.

5. A device according to claim 4, including a raised strip of material at one end of said base plate means for supporting said hinge means.

6. A device according to claim 4, including raised strips of material at both ends of said base plate means for supporting said hinge means.

7. A device according to claim 1, wherein said frame means includes a portion abutting said fence means when said frame means is closed on said base plate means.

8. A device according to claim 1, wherein said carrier means includes sides and ends defining a rectangle; crossbars extending between said sides for defining a plurality of rectangular openings for receiving film strips; and track means on said crossbars and ends for receiving the side edges of said film strips.

9. A device according to claim 8, wherein said track means includes a strip of material secured at one side to one said crossbar or end of said frame means, one end of said strip of material being bevelled to facilitate loading of a strip of film into the element.

10. A device according to claim 1, wherein said masking means includes sides and ends defining a rectangle; a crossbar extending between said sides for defining rectangular openings with said sides and ends; and cover means slidably mounted in said openings for masking selected areas beneath the element.

* * * * *